XR 3,735,032

SEARCH ROOM

United Stat
Goetze et al.

[11] 3,735,032
[45] May 22, 1973

SUBSTITUTE FOR MISSING XR

[54] TELEVISION PICK-UP TUBE DEVICE

[75] Inventors: Gerhard W. Goetze, Elmira; Rolf R. Beyer, Horseheads, both of N.Y.

[73] Assignee: Westinghouse Electric Corporation, Pittsburgh, Pa.

[22] Filed: Apr. 9, 1969

[21] Appl. No.: 814,607

[52] U.S. Cl. ....................178/5.4 ST, 178/DIG. 2
[51] Int. Cl. ....................H04n 9/06
[58] Field of Search ....................178/DIG. 2, 5.4 ST; 313/65, 89, 112; 315/10

[56] References Cited

UNITED STATES PATENTS

| | | | |
|---|---|---|---|
| 2,757,302 | 7/1956 | Hughes | 178/6 |
| 2,892,883 | 6/1959 | Hesty et al. | 178/5.4 |
| 2,901,531 | 8/1959 | McCoy et al. | 178/5.4 |
| 3,472,948 | 10/1969 | Hecker | 178/5.4 |
| 3,473,872 | 10/1969 | Okamura | 178/6 |

OTHER PUBLICATIONS

Davidson, RCA Technical Notes, "Space Redistribution of Optical Image with Light Conducting Fiber Bundle for Color TV Pickup Tube".

*Primary Examiner*—Richard Murray
*Attorney*—F. C. Henson, C. F. Renz and M. P. Lynch

[57] ABSTRACT

The invention comprises the application of a color filter assembly in conjunction with a fiber optic type faceplate of a pick-up tube to render the pick-up tube responsive to color information.

23 Claims, 4 Drawing Figures

PATENTED MAY 22 1973 3,735,032

WITNESSES

INVENTORS
Gerhard W. Goetze and
Rolf R. Beyer
BY
ATTORNEY

TELEVISION PICK-UP TUBE DEVICE

BACKGROUND OF THE INVENTION

1. Field of the Invention:

The invention relates to color television camera pick-up tubes in general, and more particularly to the application of color filters to fiber optic input camera tubes.

2. Description of the Prior Art:

Numerous television camera systems have incorporated various color filter devices to provide camera pick-up tube sensitivity to the color of a viewed scene. Attempts also have been made to incorporate a color filter device with a single pick-up tube to generate color television signals.

It has been suggested that a color filter be positioned at some distance in front of the tube glass faceplate of a pick-up tube. (Electronics, Volume 40, Page 103, Feb. 6, 1967). The scene is projected with a single lens onto the filter device and onto the faceplate of the pick-up tube. The tube is scanned at standard television rates delivering the composite video signal with interlaced color information. This approach has many attractive features and several cameras have been built and demonstrated, however, with little success, due to the fact that a pick-up tube incorporating a plane parallel glass faceplate was used which made it impossible to enforce simultaneous focus of optical scene on the photocathode and the color filter. This undesirable effect degrades the color information significantly.

The color filter has also been placed between two relay lenses in front of the tube faceplate in order to eliminate some of the above mentioned shortcomings. However, this is done only at the expense of considerable loss in sensitivity due to the added lens.

SUMMARY

The introduction of fiber optics and the application of bundled fiber optics to pick-up tube faceplates eliminates the light scattering experienced in plane parallel glass faceplates.

The fiber optic faceplate provides two distinct and well defined focal planes; namely; the photocathode on one side of the faceplate and secondly the outside or atmospheric side of the fiber optic faceplate. It now becomes possible to place a thin color filter on the outside of the faceplate while simultaneously focusing the scene image on the same plane. Optical mixing of color information is now greatly reduced and the filtered image is transmitted by virtue of the properties of the fiber optic to the photocathode.

The color filter can be applied directly as an integral part of the tube fiber optic faceplate or can be supported between two fiber optic wafers and the composite wafer treated as an independent optical component, which, if attached to a suitable television pick-up tube with a fiber optic faceplate will provide single tube color capability.

DESCRIPTION OF THE PREFERRED EMBODIMENT

Figure 1:
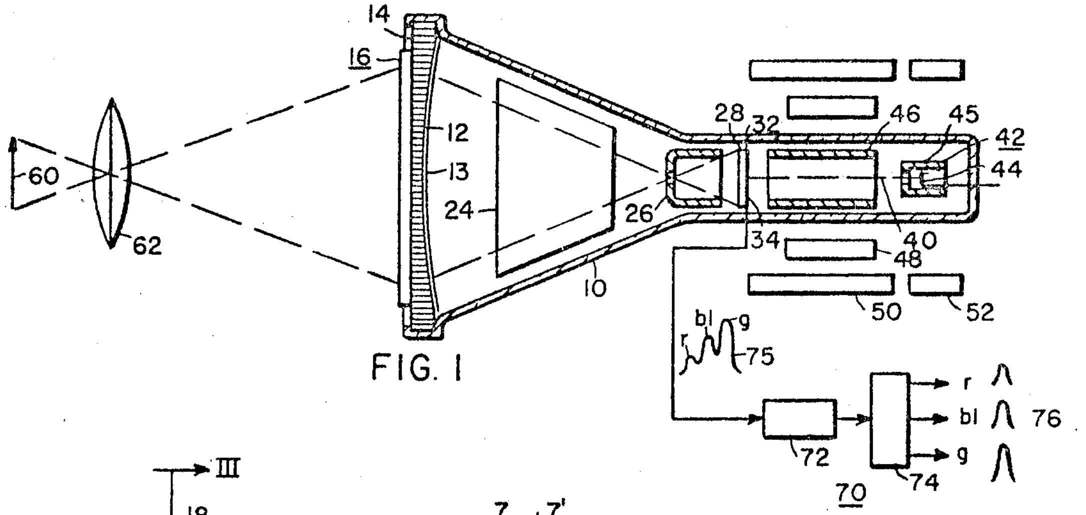
FIG. 1 is a schematic illustration of an embodiment of the present invention.

Referring to FIG. 1 there is illustrated schematically a television camera pick-up tube of any suitable type such as a vidicon, image orthicon, image dissector, iconoscope, or SEC camera tube. In the specific example shown in FIG. 1, an SEC camera tube is shown for purposes of explanation of our invention. The SEC camera tube is comprised of an evacuated envelope 10 with a photocathode structure 12 consisting of a photoemissive material layer 13 deposited on the internal surface of a fiber optic faceplate 14.

In operation a light image focused onto the photocathode 12 results in the generation at the surface of the photoemissive layer 12 of a corresponding electron image which is a replica of the light image or pattern focused on the photocathode 12. An electron lens system represented by electrodes 24 and 26 is provided for focusing a contracted replica of this electron image onto a target 28.

The target 28 is comprised of a thin layer of a material such as aluminum that is substantially transparent to electrons focused on it by the electron lens system. The face of the aluminum layer 32 remote to photocathode 12 is coated with a thin layer of insulating dielectric 34 which is briefly substantially conductive along the path of the bombarding electrons which have penetrated the aluminum layer 32. The face of the target 28 on which insulating dielectric layer 34 is coated is scanned by an electron beam 40 directed thereon by a conventional cathode ray gun 42 comprising a cathode 44, focusing electrodes 45 and 46, deflecting coil 48, focusing coil 50 and aligning coil 52 of usual forms.

The cathode 44 of the electron gun 42 is connected by a suitable lead (not shown) to ground, while the aluminum layer 32 is connected to a signal output circuit 70.

The light from the object or scene 60 to be televised in accordance with this invention is focused at the plane of a color filter assembly 16 by a suitable optical lens system 62. The image which is analyzed by the color filter assembly 16 is then directed onto the target 28 as described above. The color filter assembly 16 and the external surface of the faceplate 14 are effectively co-planar and coextensive.

The fiber optic faceplate 14 may be formed by the use of a multiple fiber optical image transfer assembly or bundle in which each of the many fine fibers thereof are of high index transparent glass and are individually coated and separated from one another by a low index glass. This low index glass serves as an optical insulation and insures good total internal relecting characteristics insofar as the light traveling from one end of each fiber to the other is concerned; and this is so notwithstanding the fact that these coated fibers are tightly fused together to form a unitary structure which is impervious to the passage of air therethrough.

The fused arrangement of the individual light conducting fibers of the fiber optic faceplate produces an integral unitary optical image transfer device.

The utilization of fiber optic face plates in television camera tubes in place of the conventional glass faceplates has resulted in increased optical efficiency and optical contrast characteristics of the image being transferred from one surface of the faceplate to the other.

In the fiber optic faceplate 14, which consists of a plurality of isolated optical paths in the form of the individual fibers, there exists two distinct and well defined focal planes; namely, the fiber optic surface in contact with the photoemissive layer 13 and secondly the fiber optic in contact with the color filter assembly 16. In other words the spacing between these contacting surfaces does not result in the diffusion of the light image and subsequent loss of contrast experienced in conventional glass faceplates.

The discussion of the structure and operative function of fiber optic faceplate 14 is applicable to all television camera tubes.

The operational advantages of the fiber optic faceplate thus far described are of further significance in that the fiber optic faceplates readily accommodate the color filter assembly 16 as a device for converting the conventional black and white television camera tube into a color responsive television camera tube by applying the filter assembly 16 in intimate contact with the exterior surface of the faceplate 14.

A color television camera system generally produces a luminance signal, corresponding to white images and a chrominance signal corresponding to the color images. The luminance signal and the chrominance signal as taught by the prior art can be derived from a single camera tube or combinations of two, three or four tubes. The physical size of the camera system, the camera sensitivity, and camera resolution are considered in selecting the number of pick-up tubes for the camera system.

In the four and two camera tube systems, one tube is utilized for the luminance signal while the remaining tube (s) develops the chrominance signal. A separate tube is designated for each of the three primary colors selected for color transmission in the four tube system whereas a single tube is utilized for transmitting all color information in the two tube systems.

The three tube system designates separate tubes for each of the three primary colors selected (generally red, blue and green) and the combined signal represents the luminance (or white) signal.

The single tube system illustrated in FIG. 1 derives chrominance and luminance signal from a single tube.

The various camera systems have merely been identified for the purpose of introducing the application of the color filter assembly 16 to fiber optic camera tubes. Inasmuch as the various camera systems are well known in the art, further discussion is not warranted.

The color information of the scene 60 provided by the filter assembly 16 of FIG. 1 is derived by scanning the corresponding electron image present on the target 28 thereby producing a sequential signal 75 comprised of a red component (*r*), a blue component (*bl*) and a green component (*g*) of various signal levels representing the intensity of the primary component colors of a segment of the scene 60.

The sequential color signal 75 derived from the target 28 is applied to an amplifier circuit 72 and subsequently supplied to a signal discriminating circuit 74 which separates the composite color signal into individual simultaneous color signals 76 corresponding to the primary colors red, blue and green.

Figure 2:
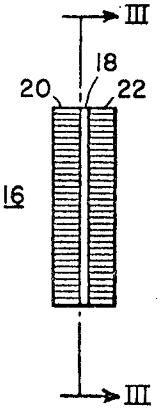
FIG. 2 is an edge view of a fiber optic color filter.

A typical embodiment of color filter assembly 16 is illustrated in FIG. 2 wherein the assembly consists of a filter 18 which is sealed within two fiber optic plates 20 and 22.

Figure 3:
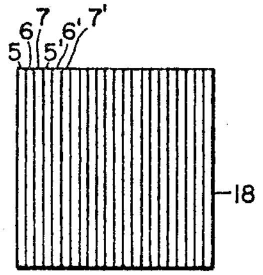
FIG. 3 is a sectioned view of FIG. 2.

The view of filter 18 illustrated in FIG. 3 depicts the construction and arrangement of strip filter elements which comprise a typical strip filter. Each successive one of the vertical strip elements is adapted to transmit light of a different color and the color strip filters are arranged in sequence of sets wherein each set includes two or more filter elements each having different color absorption properties. The filter element sets are arranged in sequence so that a strip 5 passes red light, a strip 6 passes green light, a strip 7 passes blue light, a strip 5' passes red light, a strip 6' passes green light, a strip 7' passes blue light, etc. The number of strip filter elements included in the filter 18 is a function of the required resolution. The higher the required image resolution the greater the number of filter elements used.

The filter elements 5, 6 and so forth can be formed by numerous techniques including photographic exposure of color film in the presence of a strip master.

In addition to fabricating the filter elements independent of the fiber optic cover plates 20 and 22, these filter elements may be painted on the surface of either of said cover plates with suitable dyes or the filter elements may be evaporated on the surface of one of the cover plates in a manner described in Applied Optics and Optical Engineering, Vol. 1, page 318, Academic Press (1965).

Fiber optic cover plates 20 and 22 provide mechanical rigidity and support for the filter 18 and permit the filter to be handled independent of the camera tube. Furthermore, the use of fiber optics for the cover plates 20 and 22 makes use of the collimating properties of fiber optics to minimize optical mixing of the color information and thereby maintain the color fidelity established by the fiber optic faceplate 14.

Fiber optic cover plates 20 and 22 may be fabricated to any desired size and contour shape.

The size of the fibers used in the cover plates 20 and 22 is selected in accordance with the degree of resolution desired of the image which is to be transferred through the faceplate 14. Within practical limits, smaller fibers in greater numbers provide higher degrees of image resolution.

When the fibers have been assembled as cover plates 20 and 22, the cover plates are optically finished by grinding and polishing to render the ends of the fibers readily adaptable to receive and transmit light.

The fabrication of the color filter assembly 16 wholly independent of the camera tube permits arbitrary conversion of a black and white camera tube utilizing a fiber optic faceplate into a color camera tube by applying the color filter assembly 16 to the exterior surface of the camera tube faceplate.

The application of the filter assembly 16 to the camera tube face may be accomplished by mechanically securing the filter to the faceplate or by bonding the filter to the faceplate using suitable optical cement.

Furthermore it is apparent that in addition to the independent filter adapter configuration of FIG. 2 that the filter elements may be applied directly to the exterior surface of the fiber optic camera tube faceplate without either of the fiber optic cover plates being utilized; or the filter may be applied directly to the faceplate with a single fiber optic cover plate applied to provide filter protection.

The three element color strip filter illustrated in FIG. 3 and described in combination with the fiber optic pick-up tube in FIG. 1 represents one form of a color filter.

It is equally feasible and in some applications desirable to utilize strip filters comprised of two or four element sets.

In addition to providing a filter element for each of the three primary colors a fourth element can be included following each set of color strip elements which transmits no light and in effect can be considered a reference element. The effect of this reference element is to transmit a reference signal to the output circuit 70 following each series of color information signals thus acknowledging the end of a complete set of color signals. The output circuit 70 is indexed by said signal so as to anticipate the succeeding set of color signals. The synchronization provided by the reference filter strip reduces the complexity of the output circuit 70.

While the addition of a fourth filter strip provides distinct advantages over filter strip sets of fewer filter elements, it also exhibits the undesirable effect of reducing system resolution by minimizing the number of filter strip sets present in the color filter.

In color camera systems utilizing two pick-up tubes one generating a luminance signal and the second generating the chrominance signal, a color filter comprised of a plurality of dual filter element sets can be employed thereby achieving optimum system resolution. The luminance pick-up tube which is equivalent to the pick-up tube employed in black and white transmission generates a signal representative of the brightness of the scanned scene. Due to the fact that a combination of proper ratio of the primary colors constitutes the color white, the chrominance pick-up camera tube can be employed to generate a composite signal of two of the three primary colors with the output signal circuit 70 arranged to derive the third primary color signal components by manipulation of the luminance and chrominance signals. In this application the color filter could be in the form of alternately red and blue color strips with the green signal derived electronically by subtracting the red and blue color signals from the luminance signal.

In a single color tube system, a filter scheme utilizing filter elements to derive both chrominance and luminance scene information represents a desired reduction in color camera complexity.

The single color tube filter set may, for example, comprise chrominance filter elements such as red and blue in combination with a luminance filter element. The luminance filter transmits all the spectral components of the viewed scene and therefor can be utilized as a reference, or indexing signal, as well as providing the capability of deriving a third primary chrominance signal, such a signal corresponding to the color green, by subtracting the red and blue color signals from the luminance signal. The dual function of the luminance filter element minimizes the number of filter elements in a filter set and thereby improves the single tube color resolution.

Figure 4:
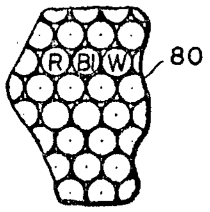
FIG. 4 is a partial view of a color dot filter.

A form of a color filter applicable to a single color tube system is illustrated in FIG. 4 in which the individual filter elements are in the form of color dots 80 arranged in the proper sequence to form filter sets. The filter element designated W represents the luminance filter element. The color dots can be formed utilizing the same techniques available for fabrication of color strip filter elements. The color dots may be painted on the surface of the thin glass support plate and the plate subsequently positioned against the fiber optic tube faceplates so as to establish contact between the color dots and the faceplate fiber optic.

In addition to the application of color filter dot elements to a support plate, the dot color filter can be in the form of an integral fiber optic color filter wherein the individual fibers are treated throughout the length of the fiber to form the color dot filter elements. The treated fiber optic filters substantially reduces loss of color dot elements due to wear or poor adherence experienced by color dot elements applied to a support surface.

Various modifications may be made within the spirit of the invention.

We claim:

1. In combination with a television pick-up tube including a light transmitting glass faceplate structure having an internal and external surface, said faceplate structure exhibiting two distinct and well defined focal planes corresponding substantially to the internal and external faceplate surfaces, said faceplate structure providing integral unitary optical image transfer therethrough, a photosensitive member associated with said internal surface, and filter means optically associated with the external surface of said faceplate structure and physically supported thereon.

2. In combination as claimed in claim 1 wherein said filter means is positioned with respect to said external faceplate surface to be substantially co-planar therewith.

3. In combination as claimed in claim 1 wherein said filter means is maintained in physical contact with the external surface of said faceplate structure.

4. The combination as claimed in claim 1 wherein said faceplate structure is of a glass fiber optic type.

5. In combination as claimed in claim 1 wherein said filter means is a multiple element color filter means in the form of a faceplate adapter which converts black and white television transmission into color television transmission by securing said filter means in physical contact with the external surface of the faceplate structure of said television pick-up tube.

6. In combination as claimed in claim 5 wherein said filter means comprises chrominance filter elements for transmitting color components of a projected image, and luminance filter elements, said chrominance filter elements combined with said luminance filter elements to form filter sets.

7. In combination as claimed in claim 6 wherein said luminance filter elements are capable of transmitting substantially all the spectral components of the projected image.

8. In combination as claimed in claim 6 wherein said filter sets include at least two chrominance filter elements and a luminance filter element.

9. In combination as claimed in claim 5 wherein said color filter elements constituting the multiple element color filter means are applied to the external surface of said faceplate structure to form an integral part thereof.

10. In combination as claimed in claim 9 further including a fiber optic cover plate applied to the exposed surface of said color filter means.

11. In combination as claimed in claim 5 wherein said multiple element filter means includes a light transmitting plate, said filter means positioned in physical contact with the light transmitting plate to form an independent optical component, which when applied to the faceplate of a fiber optic type pick-up tube renders said tube sensitive to color information.

12. In combination as claimed in claim 11 wherein said light transmitting plate is of a fiber optic type.

13. In combination as claimed in claim 5 wherein said color filter elements are in the form of parallel strips.

14. In combination as claimed in claim 5 wherein said color filter elements are in the form of dots.

15. In combination as claimed in claim 1 wherein said filter means comprises a plurality of light transmitting fiber filter elements having different color adsorption properties.

16. Color television transmitting apparatus comprising:

a single television pick-up tube including a light transmitting faceplate structure having an internal and an external surface, said faceplate structure exhibiting two distinct and well defined focal planes corresponding to the internal and external faceplate surfaces said faceplate structure providing integral unitary optical image transfer therethrough, a color filter means optically associated with the external surface of said faceplate structure and physically supported thereon, means for projecting an image of the scene or object to be televised onto said filter means, a target upon which a combined electron or optical replica of said filtered image is formed, means for scanning said target to generate a signal corresponding to the color intensity of the projected image, and means for deriving the constituent color information of the projected image.

17. Color television transmitting apparatus as claimed in claim 16 wherein said filter means is positioned with respect to said external faceplate surface such that the external surface of the faceplate structure and said filter means are effectively co-planar and coextensive.

18. Color television transmitting apparatus as claimed in claim 16 wherein said filter means is maintained in physical contact with the external surface of said faceplate.

19. Color television transmitting apparatus as claimed in claim 16 wherein said filter means comprises chrominance filter elements for deriving signals corresponding to color components of the projected image, and luminance filter elements, said chrominance filter elements combined with said luminance filter elements to form filter sets.

20. Color television transmitting apparatus as claimed in claim 19 wherein said luminance filter elements are capable of transmitting substantially all the spectral components of the projected image.

21. Color television transmitting apparatus as claimed in claim 20 wherein the luminance signal provided by the luminance filter functions as an indexing signal for said means for deriving the constituent color information of the projected image.

22. Color television transmitting apparatus as claimed in claim 19 wherein said filter sets include at least two chrominance filter elements and a luminance filter element.

23. Color television transmitting apparatus as claimed in claim 16 wherein said filter means comprises chrominance filter elements for deriving signals corresponding to color components of the projected image, and reference filter elements which are substantially opaque, said chrominance filter elements combined with said reference filter elements to form filter sets.

* * * * *